United States Patent [19]
Miller et al.

[11] Patent Number: 5,491,634
[45] Date of Patent: Feb. 13, 1996

[54] ANTI-LOCK BRAKING SYSTEM CONTAINING LOOK-UP TABLE FOR DETERMINING WHEEL VELOCITY AND ACCELERATION

[75] Inventors: Roger L. Miller, San Jose; Thomas P. Harper, Sunnyvale, both of Calif.

[73] Assignee: National Semiconductor Corporation, Santa Clara, Calif.

[21] Appl. No.: 319,206

[22] Filed: Oct. 6, 1994

Related U.S. Application Data

[62] Division of Ser. No. 191,564, Feb. 2, 1994.

[51] Int. Cl.$^6$ ................................................ B60T 17/00
[52] U.S. Cl. .................. 364/426.02; 364/565; 303/168
[58] Field of Search .................... 364/426.01, 426.02, 364/426.03, 565, 761, 765, 715.02; 324/160, 166; 303/95, 92, 100, 102, 103; 180/197

[56] References Cited

U.S. PATENT DOCUMENTS

| | | | |
|---|---|---|---|
| 3,859,512 | 1/1975 | Ritzinger | 235/151.3 |
| 4,355,279 | 10/1982 | Younge | 324/166 |
| 4,823,301 | 4/1989 | Knierim | 364/761 |
| 4,917,443 | 4/1990 | Kramer et al. | 303/92 |
| 4,991,132 | 2/1991 | Kadota | 364/765 |
| 4,992,730 | 2/1991 | Hagiya | 324/160 |
| 5,012,438 | 4/1991 | Yamaguchi | 364/765 |
| 5,176,429 | 1/1993 | Junichi et al. | 303/92 |
| 5,193,886 | 3/1993 | Gloceri | 303/92 |
| 5,193,887 | 3/1993 | Bleckmann et al. | 303/92 |
| 5,231,597 | 7/1993 | Komatsu | 324/160 |
| 5,239,470 | 8/1993 | Komatsu | 364/715.02 |
| 5,307,293 | 4/1994 | Sakai | 364/565 |

*Primary Examiner*—Gary Chin
*Attorney, Agent, or Firm*—Skjerven, Morrill, MacPherson, Franklin & Friel; David E. Steuber; David T. Millers

[57] ABSTRACT

An anti-lock braking system includes a mechanism for releasing a brake and a digital circuit for determining a wheel velocity and controlling the mechanism to prevent the brake from locking. The digital circuit uses a look-up table which, in response to an address signal, provides a signal indicating a multiplicative inverse of a number between 1 and 2. The circuit receives a measured time for a wheel to move a fixed distance and factors the time as product a power of two and a factor between 1 and 2. An address signal indicating the factor is applied to the look-up table, and the look-up table provides a signal which indicates the inverse of the factor. The signal from the look-up table is then converted to the proper scale for the time. Factoring and conversion may be accomplished with logical shifts so that no multiplier is required. The look-up table may be compressed by not storing bits of inverses, which are constant or only change once within the range of the look-up table and by only storing look-up values for every other number within the range of the look-up table. A code bit in each look-up table value permits generation of correct inverses for values not stored.

8 Claims, 2 Drawing Sheets

5,491,634

ANTI-LOCK BRAKING SYSTEM CONTAINING LOOK-UP TABLE FOR DETERMINING WHEEL VELOCITY AND ACCELERATION

This application is a division of application Ser. No. 08/191,564, filed Feb. 2, 1994.

CROSS-REFERENCES TO RELATED APPLICATIONS

This application is related to and incorporates by reference U.S. patent application Ser. No. 08/191,823 by Roger L. Miller entitled "DISASTER AVOIDANCE CLOCK FOR ANTI-LOCK BRAKING SYSTEM", U.S. patent application Ser. No. 08/190,812 by Roger L. Miller and Timothy T. Regan entitled "FAILSAFE VOLTAGE REGULATOR WITH WARNING SIGNAL DRIVER" and U.S patent application Ser. No. 08/190,881, now U.S. Pat. No. 5,372,910, by Roger L. Miller and Thomas P. Harper entitled "ANTI-LOCK BRAKING SYSTEM"; all filed on the same date and assigned to the same assignee as the present application.

FIELD OF THE INVENTION

This invention relates to use of a look-up table in place of a divider in a digital circuit, and in particular to use of a look-up table to determine a velocity in a low cost anti-lock braking system.

BACKGROUND INFORMATION

In many digital systems it is necessary to perform divisions where either the dividend or divisor is a fixed quantity. For example, some heart rate monitors measure a time T between two heart beats and determine a heart rate which is the multiplicative inverse $1/T$ or $T^{-1}$ of the time. Another example digital system is an anti-lock braking system which uses a velocity ($d/\Delta T$) which may be determined from a fixed distance d traveled in a measured time $\Delta T$. Because the distance d is fixed, the multiplicative inverse $\Delta T^{-1}$ of the time $\Delta T$ is proportional to the velocity, and anti-lock braking systems may calculate and use the multiplicative inverse $\Delta T^{-1}$ in place of the velocity.

Prior art digital systems typically determine multiplicative inverses by dividing, using a math block with a hardware divider. Hardware dividers are fast enough for most applications including anti-lock braking system but are expensive because hardware dividers require a large area in an integrated circuit. Other systems use software divide techniques instead of hardware. However, software divides can be too slow for some anti-lock braking system applications. To speed up a software divide, two or more processors working in parallel can be employed, but using more than one processor increases system cost. Accordingly, fast and inexpensive circuits are needed for dividing.

SUMMARY OF THE INVENTION

In accordance with the present invention, a digital circuit divides a constant dividend by a variable divisor using a look-up table which, in response to an address signal depending on the divisor, provides a signal indicating the quotient.

In one embodiment, the dividend has a fixed value of one, and the look-up table stores values indicating multiplicative inverses of a predetermined range of divisors. In operation, the circuit factors the divisor as a product of a power of two ($2^N$) and a factor within the predetermined range of divisors. An address signal indicating the factor is applied, and the look-up table provides a signal which indicates the inverse of the factor. The signal from the look-up table is then converted to the proper scale using the exponent N. The factoring and converting can be accomplished using either logical shifts or addition so that no multiply (or divide) is required.

In one embodiment of the invention, a value to be inverted is factored by storing an integer representation of the value to be inverted in a register then shifting the value in the register left until the most significant non-zero bit of the integer representation is shifted into a carry bit of the register. The shifted value in the register indicates a factor between one and two, (the carry bit representing one and the remaining bits in the register representing a fraction added to one). The number of shifts indicates a power of two which when multiplied by the factor, provides the value to be inverted. The look-up table stores values corresponding to inverses of values between one and two. An inverse value corresponding to the factor is read from the look-up table and shifted to the proper scale as indicated by the number of shifts.

In another embodiment, the entries in the look-up table are compressed to reduce the amount of data stored. Most significant bits which are constant or only change once for all values in the look-up table are not stored but are appended during conversion. The look-up table can be further compressed by only storing values for every other value within the range of the look-up table and incorporating into the stored values a code bit which indicates how to generate values that were not stored in the look-up table.

DETAILED DESCRIPTION OF THE PREFERRED EMBODIMENTS

Figure 1:
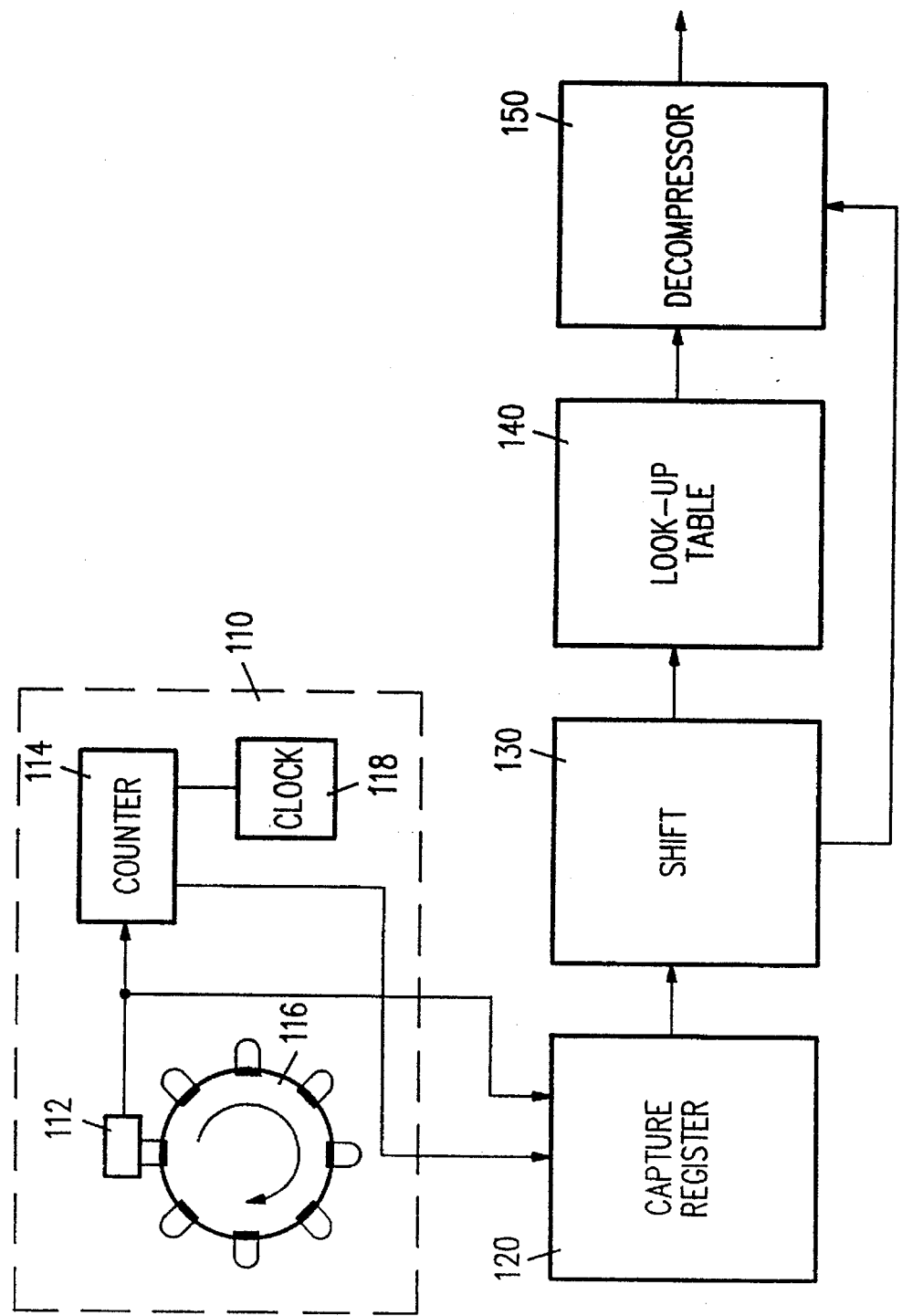
FIG. 1 shows a block diagram of a rate sensor in accordance with the present invention.

FIG. 1 shows a block diagram of a rate sensor in accordance with the present invention. The rate sensor shown is employed in an anti-lock braking system to provide a digital signal indicating the rotational velocity of a tire. Typical anti-lock braking systems periodically determine the velocity and acceleration of a rotating automobile tire. If a brake locks during braking, the tire stops rotating and skids as the automobile keeps moving. An anti-lock braking system determines from the velocity and acceleration when a skid occurs and temporarily releases the brake. The temporary release of the brake stops the tire from skidding and therefore increases traction between the tire and road and reduces the overall stopping distance of the automobile. In a typical anti-lock braking system, the velocity must be sensed at least once every 5 ms. Accordingly, the tire travels only a short distance between consecutive sensing of velocity, and fast velocity and acceleration calculations are required.

In FIG. 1, a timer 110 includes a counter 114 which counts clock pulses from a clock circuit 118. Counter 114 monitors a wheel speed sensor which includes a gear 116 which rotates at a rate that is proportional to the rotational velocity of a tire. Iron teeth on gear 116 rotate between a magnet and coil 112 and periodically strengthen the magnetic field through coil 112. The changing magnetic field induces an AC voltage which is provided to counter 114 so that counter 114 is periodically reset according to the frequency of the AC voltage from coil 112. Just before counter 114 is reset, a capture register 120 captures from counter 114 a time count C. If wheel 116 stops moving so that clock-counter 114 is not reset within the desired sampling period, a maximum time value is provided to capture register 120 and error status signal may be set. In one exemplary anti-lock braking system, clock 118 provides a 1 MHz clock signal, and the time count C represents the number of microseconds required for gear 116 to rotate the fixed distance from one tooth to the next.

The time count C is typically stored in capture register 120 in an integer representation. An integer representation is a set of bits where each bit represents a different power of two, and the least significant bit (LSB) represents $2^0$. For example, a binary integer representation of thirteen is 1101 because $1 \times 2^3 + 1 \times 2^{2+} \; 0 \times 2^1 + 1 \times 2^0$ equals 13. An integer representation is a special case of a fixed point representation. In a fixed point representation, each bit represents a different power of two, but the LSB is not restricted to representing $2^0$. The LSB represents a power of two that depends on the format of the fixed point representation. For example, in one unsigned 4-bit binary fixed point representation, the LSB corresponds to $2^{-3}$ and 1101 represents 1.625 or ($1 \times 2^0 + 1 \times 2^{-} + 0 \times 2^{-2} + 1 \times 2^{-3}$).

The structure shown in timer 110 is only one example which can be employed in an anti-lock braking system. Other timers which are known or yet to be developed can be used in place of timer 110.

Capture register 120 stores the count C which indicates the time for wheel 116 to rotate one tooth. Capture register 120 can be a shift register, a memory location, or another storage device. From a fixed distance d that a tire travels while wheel 116 rotates from one tooth to the next and the time $\Delta T$ required to travel the distance d, a velocity v may be determined. The velocity v is proportional to the multiplicative inverse of the time $\Delta T$ or the time count C (i.e., $v \propto \Delta T^{-1} \propto C^{-1}$), so that the multiplicative inverse $C^{-1}$ of count C can be used instead of the velocity v in calculations performed by the anti-lock braking system. For example, the anti-lock braking system can release braking depending on the inverse of the count or the rate of change in the inverse of the count. The velocity and acceleration in standard length and time units are not needed.

For fixed distance d, a velocity $v = d/\Delta T$ can be determined using a look-up table that includes velocity values for every possible value of the time interval $\Delta T$. This would eliminate the need for a conventional multiplier or divider but, in many applications, such look-up tables would be too large to be practical. A mathematical property of division permits use of a smaller look-up table. If time interval $\Delta T = 2^N * \Delta t$, then the velocity $v_{\Delta T}$ which corresponds to the time $\Delta T$ and the velocity $v_{\Delta t}$ which corresponds to the time $\Delta t$ are related by the following equation.

$$v_{\Delta T} = d/\Delta T = d/(2^N * \Delta t) = 2^{-N} * (d/\Delta t) = 2^{-N} * v_{\Delta t}.$$

Accordingly, if velocity $v_{\Delta t} = d/\Delta t$ is known for values of time $\Delta t$ between 1 and 2 (or values between any successive powers of two), velocity $V_{\Delta T}$ for all other values of time $\Delta T$ can be determined by multiplication of $v_{\Delta t}$ by an appropriate power of two. In digital systems, multiplying by a power of two is equivalent to a binary shift of a fixed point representation, and neither a multiplier nor a divider is required.

In order to use a smaller look-up table, shift block 130 converts the count C into a factor X between 1 and 2 and an exponent N for a power of two, with C equal to $X*2^N$. Such conversions are well known in the art and commonly implemented using many well known techniques for conversion of an integer representation to a floating point representation. Shift block 130 may, for example be implemented as software executed on a processor or as hardware which causes the value in register 120 to be factored.

In one embodiment, the count C is initially stored in capture register 120 in an integer representation, and then shifted to the left. The shift block 130 counts the number of single bit logical left shifts required to shift the most significant non-zero bit of the count C into a carry bit. If the number of shifts is S and capture register 120 contains R bits, the exponent N is R-S. After shifting the count in register 120, the shifted value in register 120 indicates a fraction X' which is between 0 and 1. The carry bit is always one. Accordingly, the combination of the carry bit and the fraction X' indicates a factor X between 1 and 2. The fraction X' provides an address for a look-up table 140 and is approximately equal to the mantissa of the logarithm base 2 of the factor X.

Look-up table 140 holds multiplicative inverse values Y corresponding to a domain of values X between 1 and 2. Look-up table 140 may be implemented as a portion of RAM, ROM, EPROM, EEPROM, or other memory which, in response to an address signal indicating the value X, provides to a decompressor 150 a value Y indicating the multiplicative inverse $X^{-1}$ of the value X. The multiplicative inverse $X^{-1}$ equals the special case of a quotient with dividend d equal to one. Decompressor 150 converts the value Y from look-up table 140 into the desired velocity (or multiplicative inverse) by combining Y with the exponent N provided by shift block 130. The actions of decompressor 150 depend on the representation of the values Y in the look-up table, and are disclosed in detail for specific embodiments below. Decompressor 150 is typically implemented in software.

In one embodiment, the value Y supplied by look-up table 140 is a floating point representation of the multiplicative inverse $X^{-1}$ of the factor X, and decompressor 150 subtracts of the exponent N from an exponent of the floating point representation of the value Y to provide a floating point representation of the inverse $C^{-1}$ of count C.

In another embodiment, the value Y supplied by look-up table 140 is a fixed point representation of the multiplicative inverse $X^{31\ 1}$, and decompressor 150 shifts the value Y to the right N bits. Table 1 shows an example of a look-up table having for stored values Y which equal the multiplicative inverse $X^{-1}$.

TABLE 1

| X | Y |
|---|---|
| 1.000 | 1.000 |
| 1.001 | .1110 |
| 1.010 | .1101 |
| 1.011 | .1100 |
| 1.100 | .1011 |
| 1.101 | .1010 |
| 1.110 | .1001 |
| 1.111 | .1000 |
| 10.00 | .1000 |

Both X and Y are shown as 4-bit binary values, and stored values Y are rounded to four bits of accuracy.

In still another embodiment, look-up table 140 provides a value Y in a compressed format which reduces the amount of memory required for look-up table 140, and decompressor 150 decompresses a value Y from look-up table 140 while combining the value Y with the exponent N.

In an example embodiment wherein look-up table 140 contains compressed values Y, capture register 120 initially holds a count C which is to be inverted. Count C is provided as a 16-bit integer between $0000 and $FFFF ("$" indicates hexadecimal) and capture register 120 is a 16-bit register. Other limits for the count C are possible. For example, a minimum count such as $1FF may be set to avoid determination of the multiplicative inverse of zero. Also, an upper limit of $7FFF permits use of conventional 16-bit signed integers capable of representing positive or negative values.

The integer representation of count C is shifted left S bits until the most significant bit (MSB) of the count C is shifted into the carry position. After S shifts capture register 120 contains a high byte X' which ranges from $00 to $FF. Rounding to nine bits of accuracy, factor X equals (1+X'/256), and the count value C equals $X*2^N$ where exponent N equals 16 minus S.

The carry bit combined with high byte X' expresses the factor X to nine significant bits in a fixed point format, with the carry bit being the integer part and byte X' being the fractional part. In this format, the factor X ranges from $100 to $1FF and represents values between 1 and 2. The most significant bit of X, the bit in the carry position, is always 1 and can be ignored when using look-up table 140. The byte X' indicates the factor X and is the address signal supplied to look-up table 140. In another embodiment, the byte X' is transformed before being applied as an address signal, for example by adding or subtracting an offset or shifting to provide an even address for retrieving values Y that are word size or larger.

All inverses $X^{-1}$ for 1<X<2 are greater than 0.5 but less than 1. Therefore, fixed point representations of the inverses $X^{-1}$ have a bit corresponding the power $2^{-1}$ set. Accordingly, fixed point values Y stored in look-up table 140 do not need to store the bit representing $2^{-1}$. Decompressor 150 can append the bit representing 24 before producing a final inverse value. This permits eight bits in look-up table 140 to provide an inverse to nine bits of accuracy.

A bit corresponding to $2^{-2}$ in a fixed point representation of the inverse $X^{-1}$ is 0 for X greater than 4/3 and 1 for X less than 4/3. Accordingly, the bit corresponding to $2^{-2}$ can be removed from values Y stored in look-up table 140, and decompressor 150 can add the removed bit when decompressing a Y value. Decompressor 150 compares the value X to 4/3 and if X is less than 4/3, sets the bit in value Y corresponding to $2^{-2}$. If X is greater than 4/3, decompressor 150 clears the bit corresponding to $2^{-2}$.

Further, for the 256 possible 9-bit X values from $100 to $1FF, there are to 9-bit accuracy 256 different inverses $X^I$. Values X which are kept to ten bits of accuracy differ from 9-bit values X by an appended least significant bit which is either 0 or 1. 10-bit values X with an appended bit equal to 0 are referred to herein as even. 10-bit values X with an appended bit equal to 1 are referred to herein as odd. If the appended bit is 0, the values from the table provide the correct inverse to nine bits of accuracy. If the appended bit makes X is odd, the inverse to 9-bits of accuracy is either the same as the inverse of the even value X or differs only in the least significant bit from the inverse of the even value X. Accordingly, if the difference in the inverses between neighboring even and odd values X can be determined, the look-up table can provide inverses for 512 10-bit values X using 256 different values Y one for each value X between $100 and $1FF.

Storing in a look-up table only even or only odd values of the inverse is not restricted to 9 bits of accuracy. When values X have one more bit of accuracy than the inverses $X^{-1}$ have, the inverses $X^{-1}$ can be determined using a look-up table with half the number of entries as there are values X. For example, to ten bits of accuracy, there are 512 different values X between 1 and 2 but the inverse $X^{-1}$ to nine bits of accuracy can be determined using only 256 entries.

To use values Y for only even values X or only odd values X, some method is required for determining if the neighboring value X has the same approximate inverse or an inverse that differs by one in the least significant bit. One method for indicating whether the inverse differs is providing in each value Y a code bit to indicate whether the inverse for the neighboring value X is the same. For example, with fixed point representations of the inverse, the bit representing $2^{-1}$ is always set and would typically not be provided in the look-up table. The bit representing $2^{-2}$ is 0 for X greater than 4/3 and 1 for X less than 4/3. Accordingly, the bit representing $2^{-2}$ can be replaced with a code bit that, for example, is 1 if the inverses $X^{-1}$ and $(X+1)^{-1}$ for neighboring even and odd values X and X+1 differ and is 0 if the neighboring even and odd values are the same to the accuracy to be provided. Decompressor 150 changes values from look-up table 140 according to the code bit then reconstructs the correct $2^{-2}$ bit by comparing the factor X to 4/3 (or comparing X' to $55).

Table 2 contains a list of 8-bit values Y corresponding to X values between $100 and $1FF.

TABLE 2

| | | | | | | | |
|---|---|---|---|---|---|---|---|
| $FF, | $FD, | $FB, | $F9, | $F7, | $F5, | $73, | $F2 |
| $F0, | $EE, | $EC, | $EA, | $E8, | $66, | $E5, | $E3 |
| $E1, | $DF, | $DE, | $DC, | $DA, | $58, | $D7, | $D5 |
| $53, | $D2, | $D0, | $4E, | $CD, | $CB, | $CA, | $CS |
| $46, | $C5, | $C3, | $C2, | $C0, | $BF, | $BD, | $BC |
| $BA, | $B9, | $B7, | $B6, | $B4, | $B3, | $31, | $B0 |
| $2E, | $AD, | $AC, | $2A, | $A9, | $27, | $A6, | $A5 |
| $23, | $A2, | $A1, | $1F, | $9E, | $9D, | $1B, | $1A |
| $99, | $98, | $16, | $95, | $94, | $93, | $11, | $90 |
| $8F, | $8E, | $0C, | $0B, | $SA, | $89, | $88, | $87 |
| $05, | $04, | $03, | $82, | $81, | $80, | $FF, | $7D |
| $7C, | $7B, | $7A, | $F9, | $F8, | $F7, | $F6, | $F5 |
| $F4, | $F3, | $F2, | $F1, | $6F, | $6E, | $6D, | $6C |
| $6B, | $6A, | $69, | $68, | $67, | $66, | $65, | $64 |
| $63, | $E3, | $E2, | $E1, | $E0, | $DF, | $DE, | $DD |
| $DC, | $SSB, | $SA, | $59, | $58, | $57, | $56, | $D6 |

TABLE 2-continued

| | | | | | | | |
|---|---|---|---|---|---|---|---|
| $D5, | $D4, | $D3, | $52, | $51, | $50, | $4F, | $CF |
| $CE, | $CD, | $4C, | $4B, | $4A, | $49, | $C9, | $CS |
| $47, | $46, | $45, | $C5, | $C4, | $43, | $42, | $41 |
| $C1, | $C0, | $3F, | $3E, | $3D, | $BD, | $3C, | $3B |
| $3A, | $BA, | $39, | $38, | $37, | $B7, | $36, | $35 |
| $34, | $B4, | $33, | $32, | $B2, | $31, | $30, | $2F |
| $AF, | $2E, | $2D, | $AD, | $2C, | $2B, | $AB, | $2A |
| $29, | $A9, | $28, | $27, | $A7, | $26, | $25, | $A5 |
| $24, | $23, | $A3, | $22, | $21, | $A1, | $20, | $1F |
| $9F, | $1E, | $9E, | $1D, | $1C, | $9C, | $1B, | $1A |
| $1A, | $19, | $99, | $18, | $17 | $17, | $16, | $96 |
| $15, | $14, | $14, | $13, | $93, | $12, | $92, | $11 |
| $10, | $10, | $0F, | $8F, | $0E, | $SE, | $0D, | $0C |
| $0C, | $0B, | $0B, | $0A, | $SA, | $09, | $89, | $08 |
| $88, | $07, | $87, | $06, | $05, | $05, | $04, | $04 |
| $03, | $03, | $02, | $02, | $01, | $01, | $00, | $00 |

From the 256 8-bit values Y in Table 2, 9-bit inverses for 512 10-bit factors X can be determined as described above.

Using both compression techniques described above, decompressor 150 reconstructs the inverse $X^{-1}$ from the value Y provided by the look-up table and combines the inverse $X^{-1}$ with the exponent N. Such decompression or conversion would typically be implemented in software executed by a microprocessor or a microcontroller. A COP888 assembly language program which implements the above described decompression is in the appendix. The instruction set for the COP888 is publicly known and described in the "1992 Embedded Controller Data Book" available from National Semiconductor, Inc.

Figure 2:
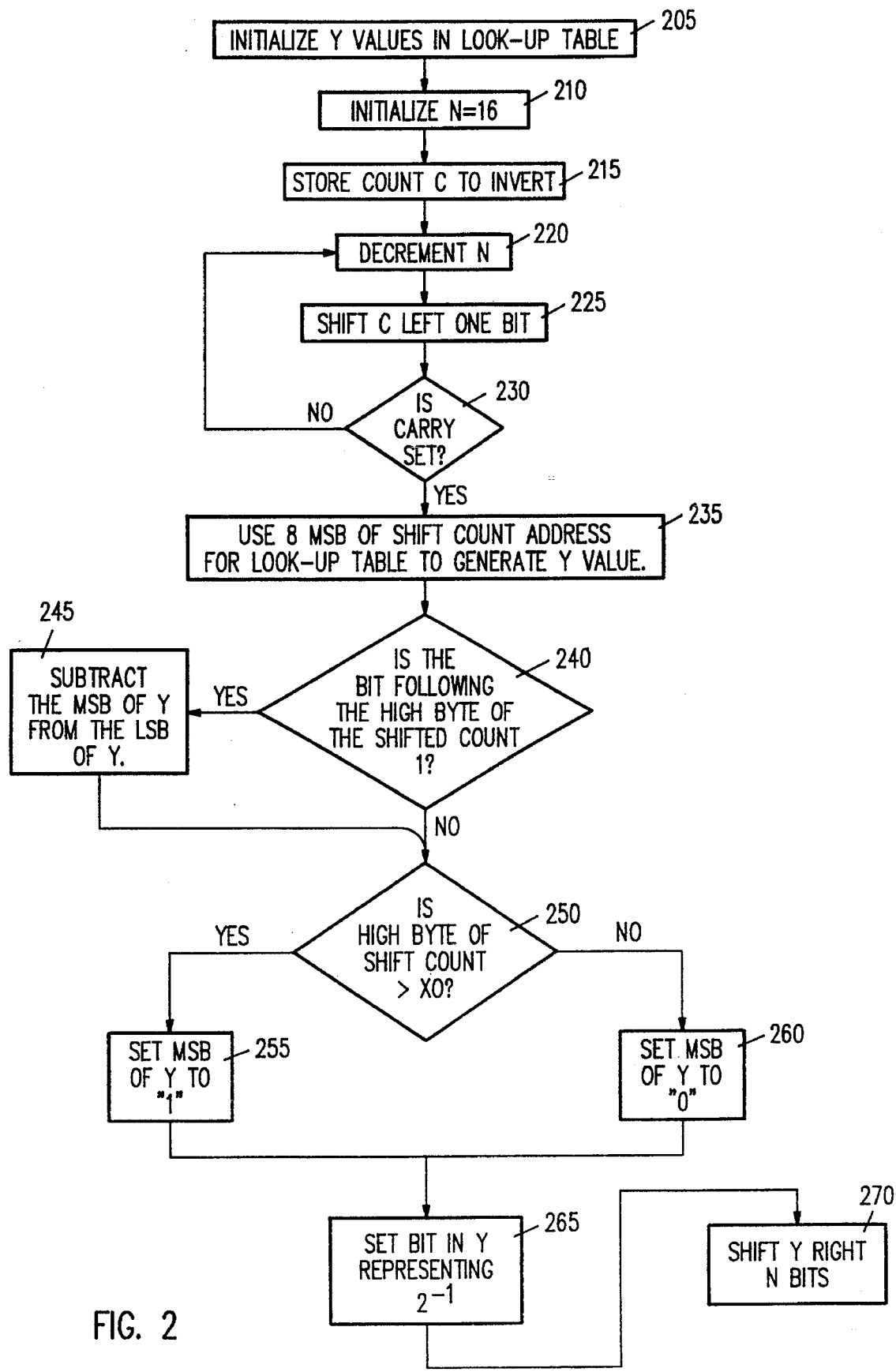
FIG. 2 shows a flow diagram of a process for providing a signal indicating a multiplicative inverse using a look-up table and look-up table compression techniques.

FIG. 2 shows a flow diagram of a process for providing a signal indicating a multiplicative inverse using a look-up table and compression techniques similar to those described above. In step 205, a look-up table is provided with the 256 values Y shown in Table 2. Each 8-bit value Y indicates a 9-bit fixed point representation of a multiplicative inverse $X^{-1}$ of an even factor X between 1 and 2 ($100 and $1FF). Of the eight bits $Y_7$-$Y_0$ in the values Y, bits $Y_6$ to $Y_0$ correspond to $2^{-3}$ to $2^{-9}$ respectively in a fixed point representation of the inverse $X^{-1}$. Bit $Y_7$ indicates whether a neighboring odd factor has the same inverse as the even factor.

In step 210, an exponent N is initialized to the number of bits which a register can hold. The count C is measured and stored into the register during step 215. Steps 220, 225, and 230 implement a loop which counts the number of single bit left shifts required to shift the most significant non-zero bit of the count C in to the carry position. In step 235, the eight MSBs of the shifted count provide an address to select a value Y from the look-up table.

The value Y is then decompressed as follows. If the bit following the high byte X' of the shifted count is one, then the factor X is odd, and step 245 is executed before step 250, otherwise step 245 is skipped. In step 245, if bit $Y_7$ is one then one is subtracted from the least significant bit of Y, but if the most significant bit $Y_7$ is zero then Y is unchanged.

In step 250, a bit indicating $2^{-2}$ is reconstructed from the shifted count. If the high byte X' of the shifted count is greater than $55 then bit $Y_7$ is cleared (step 260), otherwise bit $Y_7$ is set to one (step 255). Finally, a bit corresponding to $2^{-1}$ is set providing nine bits of accuracy (step 265), and the Y value is shifted according to the exponent N (step 270).

Although the present invention has been described with reference to particular embodiments, the description is only an example. Many other embodiments are possible. In particular, even though much of preceding disclosure was directed to determination of velocity in an anti-lock braking system, the present invention is not so limited. The circuits and processes described may be used in any digital system which determines a multiplicative inverse or determines a quotient of a fixed dividend. For example, if timer 110 in FIG. 1 is replaced by a timer which measures the time between heartbeats, the circuitry and methods disclosed above can determine a heart rate. Further, the quantity inverted need not be a time. Timer 110 can be replaced, for example, by a sensor which provides a distance for a slope determination. Also, although the above embodiments employ look-up tables which provide values Y for a factor X between 1 and 2, look-up table ranges for the factor X may be between any two successive powers of two. Also, although much of the disclosure was directed to circuits and methods which determine multiplicative inverses, methods and circuits disclosed may be used to determine the quotient of a fixed dividend by a variable divisor. In view of this disclosure, other applications and variations of the present invention will be apparent to those skilled in the art.

We claim:

1. An anti-lock braking system comprising;

a mechanism for releasing a brake on a wheel; and an electronic System Coupled to the mechanism, wherein the electronic system senses velocity of the wheel and controls when the mechanism to releases the brake to prevent locking, the electronic system comprising:

a motion sensor adapted to measure a time required for the wheel to move a fixed distance and generate a first signal indicating a fixed point representation of the time;

a shift circuit coupled to receive the first signal, wherein the shift circuit shifts the first signal to generate a second signal which indicates a factor;

a look-up table memory coupled to receive the second signal from the shift circuit and generate a data signal indicating a value which is stored in the look-up table memory, at an address indicated by the second signal, the value indicating a multiplicative inverse of the factor indicated by the second signal; and a decompressor coupled to receive the data signal from the look-up table memory, wherein the decompressor converts the data signal to a signal indicating the velocity of the wheel.

2. The system of claim 1, wherein the factor is between 1 and 2, the time is a product of the factor and an integer power of 2, and the look-up table memory stores values which indicate multiplicative inverses of numbers between 1 and 2.

3. The system of claim 1, wherein:

the shift circuit generates a third signal indicating a number of bits that the first signal is shifted to generate the second signal;

the decompressor is coupled to receive the third signal from the shift circuit; and the signal which indicates the velocity of the wheel depends upon the data signal and the third signal.

4. The system of claim 3, wherein:

the shift circuit comprises a shift register;

the value indicated by the first signal is stored in the shift register and then shifted left until a most significant non-zero bit of the value is shifted out of the shift register; and the factor indicated by the second signal depends on a value in the shift register after shifting the non-zero bit out of the shift register.

5. The system of claim 4, wherein the value in the shift register after shifting represents a fractional part of a number between 1 and 2, and the look-up table memory stores values which indicate the multiplicative inverses of numbers between 1 and 2.

6. The system of claim 1, wherein the first signal indicates an integer representation of the time required for the wheel to move the fixed distance.

7. A velocity sensor for an anti-lock braking system, comprising:

a motion sensor which, in response to a wheel moving a fixed distance, asserts a first signal which represents a time for the wheel to move the fixed distance;

a shift circuit coupled to receive the first signal, wherein the shift circuit shifts bits in the first signal to generate a second signal which indicates a factor of the time;

a look-up table memory having an address bus coupled to receive the second signal from the shift circuit; and a decompressor circuit coupled to the look-up table, wherein the decompressor circuit converts a data signal from the look-up table to a third signal representing a velocity of the wheel.

8. The system of claim 7, wherein:

the shift circuit comprises a shift register;

the value indicated by the first signal is stored in the shift register and then shifted left until a most significant non-zero bit of the value is shifted out of the shift register;

the shift circuit generates a fourth signal indicating a number of bits that the first signal was shifted to generate the second signal;

the decompressor is coupled to receive the fourth signal from the shift circuit; and the third signal which indicates the velocity of the wheel depends upon the second and fourth signals.

* * * * *

UNITED STATES PATENT AND TRADEMARK OFFICE
CERTIFICATE OF CORRECTION

PATENT NO. : 5,491,634    Page 1 of 2
DATED : February 13, 1996
INVENTOR : Roger L. Miller and Thomas P. Harper It is certified that error appears in the above-identified patent and that said Letters Patent is hereby corrected as shown below:

Column 3, line 28:
    Delete "1x2" and insert --$1x2^{-1}$--

Column 4, line 47:
    Delete "$X^{31\ 1}$" and insert --$X^{-1}$--

Column 6, Table 2:
Table 2 - Column 2, line 16
    Delete "$SB" and insert --$5B--
Table 2 - Column 3, line 16
    Delete "$SA" and insert --$5A--
Table 2 - Column 5, line 10
    Delete "SA" and insert --$8A--
Table 2 - Column 8, line 4
    Delete "$CS" and insert --$C8--

Column 7, Table 2:
Table 2, Column 8, line 18
    Delete "$CS" and insert --$C8--
Table 2, Column 6, line 29
    Delete "$SE" and insert --$8E--

UNITED STATES PATENT AND TRADEMARK OFFICE
CERTIFICATE OF CORRECTION

PATENT NO. : 5,491,634
DATED : Feb. 13, 1996
INVENTOR(S) : Roger L. Miller, et al It is certified that error appears in the above-indentified patent and that said Letters Patent is hereby corrected as shown below:

Column 8, line 43
    Delete "when the mechanism to releases"
    and insert --the mechanism to release--

Signed and Sealed this

Thirteenth Day of August, 1996

Attest:

BRUCE LEHMAN

Attesting Officer     Commissioner of Patents and Trademarks